Oct. 14, 1930.    E. H. PAULL    1,778,121
WINDOW CLEANER AND DRIER
Filed July 12, 1928
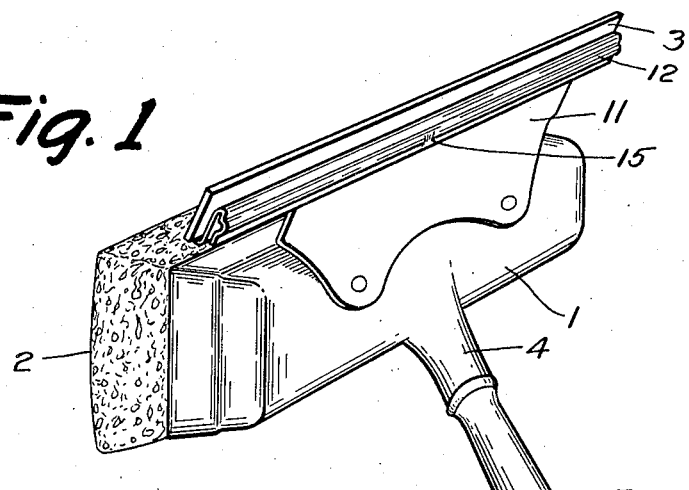
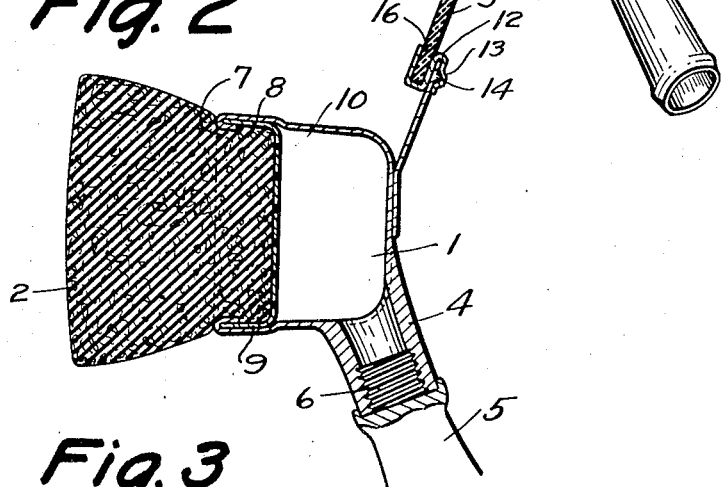
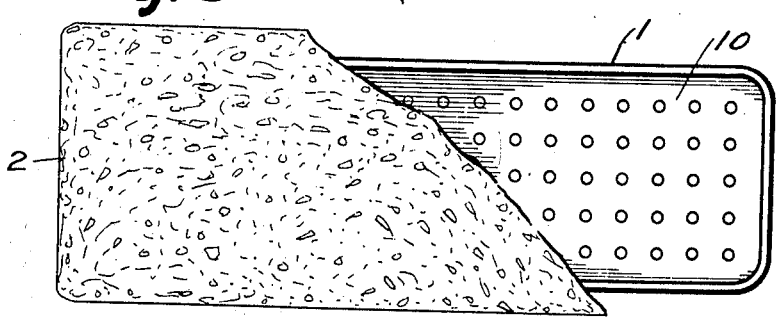
INVENTOR
Eldred H. Paull
BY
Harry Bowen
ATTORNEY Patented Oct. 14, 1930

1,778,121

UNITED STATES PATENT OFFICE

ELDRED H. PAULL, OF SEATTLE, WASHINGTON, ASSIGNOR TO WILLIAM GORDON, DOING BUSINESS AS GORDON MANUFACTURING CO., OF NEW YORK, N. Y.

WINDOW CLEANER AND DRIER

Application filed July 12, 1928. Serial No. 292,270.

The invention is a window cleaning device having a sponge rubber cleaner and a rubber strip drier in combination with means for feeding water through the sponge by the action of the sponge.

The object of the invention is to provide a window cleaning device which will automatically feed a comparatively correct amount of water as it is operated.

Another object of the invention is to provide a window cleaning device having a soft pliable porous cleaning surface.

Another object of the invention is to provide a window cleaning device having a rubber sponge in combination with a rubber strip drier in which the drier may be readily replaced.

Another object of the invention is to provide a window cleaning device having a rubber sponge in combination with a rubber strip drier in which the drier holding device is adaptable to hold driers of different lengths.

Another object of the invention is to provide a window cleaning device having a rubber spongle held in a container in such a manner that the sponge will create a suction to draw water from the container as it moves inward and outward.

A further object of the invention is to provide a window cleaning device having a sponge held in a container in which the container is readily refillable.

A still further object of the invention is to provide a window cleaning device having a rubber sponge held in a container in which the sponge may readily be replaced.

And a still further object of the invention is to provide a window cleaning device having a rubber sponge in combination with a rubber strip drier which is of a simple and economical construction.

With these ends in view the invention embodies a window cleaner and drier having a sponge rubber cleaner, a container for holding the same, a handle and a rubber strip drier attached to the said container.

Other features and advantages of the invention will appear from the following description taken in combination with the drawings, wherein:—

Figure 1 is a view showing the device as it would appear in use.

Figure 2 is a cross section through the device.

Figure 3 is an elevation looking toward the sponge rubber with part broken away.

In the drawings the device is shown as it would be made, wherein numeral 1 indicates the container, numeral 2 the sponge rubber and numeral 3 the drier.

The container 1 may be made of a rectangular shape with a stem 4 extending outward from one edge to which a handle 5 may be attached with a threaded stud 6 as shown. The opposite side of the container which is indicated by the numeral 7 is bent over as indicated by the numeral 8 and the flanges 9 of a perforated plate 10 are held under the edges thereof as shown in Figure 3. The sponge rubber cleaner 2 is forced into the space between the edges at the open end of the container and against the plate 10 as shown in Figure 3 and the edges of the sponge may be cemented to the edges of the container and flanges of the plate. It will be observed that as the sponge is forced inward by pressing the outer surface against a window pane the air in the sponge will be forced out and as the container is closed the air will pass out of the sides of the sponge and when the sponge is released it will draw equally in all directions so that it will draw some of the water from the container. The container may readily be filled with water through the stem 4 by removing the handle 5.

An upwardly extending plate 11 is attached to the back of the container and the drier 3 supported on the upper edge of the plate through a clip 12. The clip 12 is provided with a recess 13 that slides over a ridge 14 on the back of the plate 11 and the recess 13 is provided with a lug 15 that will snap into a notch in the center of the ridge 14 so that the clip 12 will be centrically located and held upon the plate 11. It will be noted that the rubber strip drier 3 is clinched in a recess 16 in the clip 12 and may readily be replaced by spreading the clip. It will also be noted that the clip 12 may readily be removed so that the drier may be removed and replaced by another drier or a drier of a different length. It will also be noted that the sponge rubber may readily be forced out of the opening of the container so that it also may readily be removed and replaced.

It will be understood that other changes may be made in the construction without departing from the spirit of the invention, one of which changes may be in the use of a container of a different design, another may be in the use of a different type of handle, another may be in the use of other means by which the container may be filled, another may be in the use of a different type of drier or other means for holding the drier and still another may be in the use of other means for holding the sponge rubber in the container.

The construction will be readily understood from the foregoing description. In use the device may be supplied as shown and described and with the container filled with water the device may be gripped by the handle 5 and the sponge rubber readily rubbed over the window pane. It will be noted that the continual pressing inward and outward will cause the water in the container to be drawn through the sponge so that a continuous supply of water will be fed to the sponge and when the pane is clean it may readily be dried by the rubber strip 3.

Having thus fully described the invention, what I claim as new and desire to secure by Letters Patent is:—

In a cleaner of the character described, a rectangular shaped receptacle having a boss extending from one side, a handle attached to the said boss and forming a closure therefor, said boss forming a filler opening, one side of the said rectangular shaped container being open, a perforated plate held in the open side of the said container and positioned a short distance from the edge thereof, and a block of sponge rubber material having openings therethrough secured in the open side of the said container and engaging the perforated plate whereby the compression and expansion of said sponge rubber will readily feed the contents of said receptacle to said sponge.

In testimony whereof I affix my signature.

ELDRED H. PAULL.